No. 704,377. Patented July 8, 1902.
A. RIEBER.
MEANS FOR PROPELLING VEHICLES.
(Application filed Sept. 20, 1901.)
(No Model.)

WITNESSES
M. C. Lyddane
S. Brashears

INVENTOR
Andreas Rieber
BY
G. Dithman
ATTORNEY

UNITED STATES PATENT OFFICE.

ANDREAS RIEBER, OF FLENSBURG, GERMANY.

MEANS FOR PROPELLING VEHICLES.

SPECIFICATION forming part of Letters Patent No. 704,377, dated July 8, 1902.

Application filed September 20, 1901. Serial No. 75,998. (No model.)

*To all whom it may concern:*

Be it known that I, ANDREAS RIEBER, a subject of the Emperor of Germany, residing at Flensburg, Germany, have invented certain new and useful Improvements in Means for Propelling Vehicles, of which the following is a specification.

This invention relates to means for propelling vehicles, and especially to means for propelling such vehicles as bicycles, tricycles, and the like, the object of the invention being to provide improved means whereby the weight of the rider may be utilized in their propulsion.

With this object in view the invention consists in the improved construction, arrangement, and combination of parts hereinafter fully described, and afterward specifically claimed.

Figure 1:
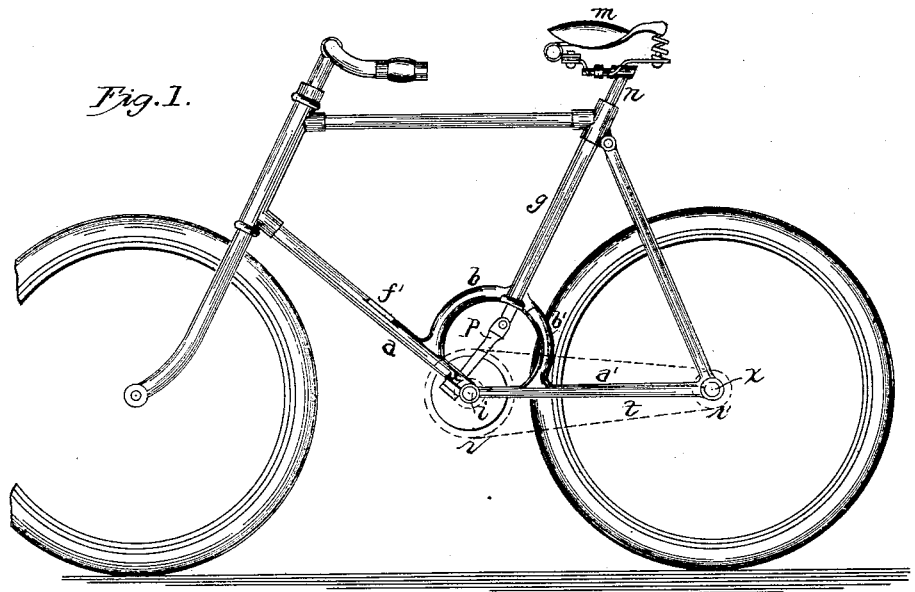
Figure 2:
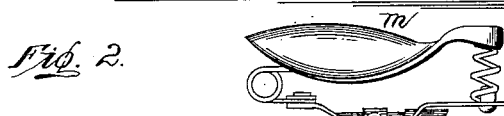
Figure 3:
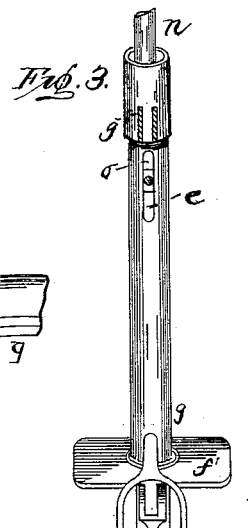
Figure 4:
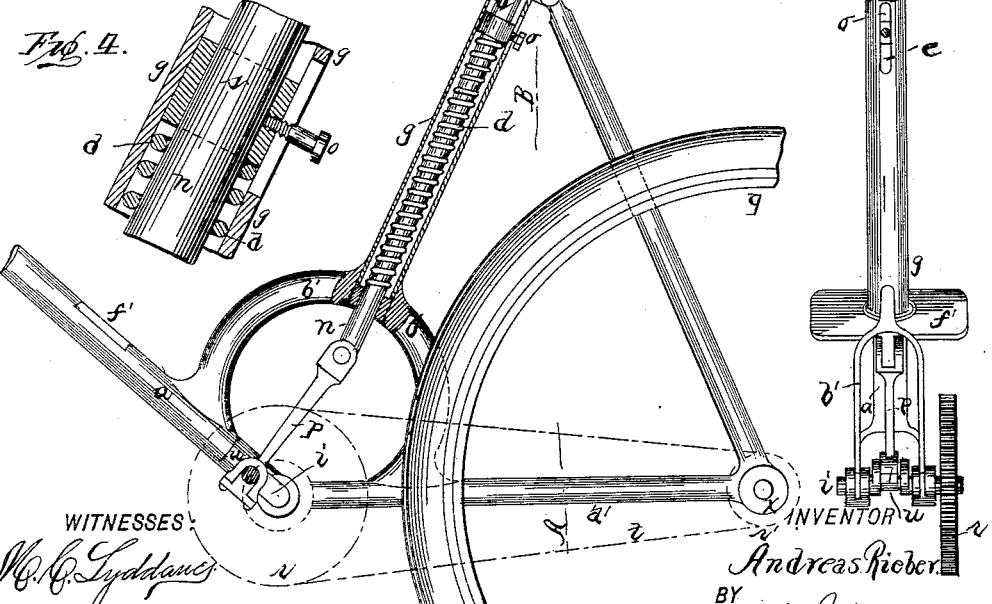

In the accompanying drawings, which illustrate a bicycle embodying my invention, Figure 1 is a view in side elevation, the spokes of the wheels being omitted and part of the front wheel broken away. Fig. 2 is a view of the propelling mechanism, partly in section, parts being broken away and parts in dotted lines. Fig. 3 is a partial transverse vertical section on the line A B of Fig. 2. Fig. 4 is an enlarged sectional detail view of a portion of the saddle-post and its raising-spring.

Like letters of reference indicate the same parts wherever they occur in the several figures of the drawings.

Referring to the drawings, the letters $a$ and $a'$ indicate, respectively, the front brace and one of the side bars of a bicycle-frame of the ordinary construction. At the junction of these parts is journaled the crank-shaft $i$. The saddle is shown at $m$ mounted and spring-supported, if desired, in any approved manner upon a saddle-post $n$, the latter being slidably mounted in the tubular upright $g$. An arched bar $b$ connects the brace $a$ with the side bars $a'$, the rear portion of the arch being bifurcated or forked, one arm $b'$ connecting with each side bar $a'$. The lower end of the tubular upright is secured in the arched bar $b$ and is open, so that the saddle-post $n$ projects below it, and is connected by a pitman $p$ with the crank $k$ of the shaft $i$, the pitman being forked at $u$ at its lower end to straddle the crank, and a bearing-clamp block $l$ being secured between the arms of the fork $u$ by means of screws or bolts $c$. A ring $s$ is adjustably secured upon the saddle-post $n$ within the tubular upright $g$ by means of a set-screw $o$, which projects through the longitudinal slot $e$ in said upright $g$. A spring $d$, coiled around the saddle-post, has its lower bearing upon the thickened or bushed portion of the tubular upright and its upper bearing against the ring $s$, with a normal tendency to raise the saddle-post $n$ by the pressure against said ring.

The axle of the rear or driving wheel $q$ is indicated at $x$, and any usual gearing, as a chain $t$, may connect a wheel $r$ on shaft $i$ with a wheel $r'$ on axle $x$ to transmit motion from $i$ to $x$, the wheels $r$ and $r'$ being shown in dotted lines in Fig. 2.

Upon the front brace $a$ is secured a foot-rest $f$, the use of which will be later explained.

The device illustrated operates as follows: The rider seating himself in the saddle $m$, with his feet resting upon the foot-rest $f$, permits his weight to rest upon the saddle, thus pressing the saddle-post $n$ downward and causing a half-revolution of the shaft $i$ through the medium of the crank $c$ and pitman $p$. By pressing on the foot-rest the rider now raises his weight off the saddle, when the spring $d$ will raise the saddle-post, thus completing a revolution of the shaft $i$, and by a repetition of these movements a continuous revolution of shaft $i$ is effected, which motion is transmitted to the driving-wheel $q$, as before described. By means of the ring $s$ and set-screw $o$ the tension of spring $d$ is varied to suitably coöperate with the weight of heavier or lighter persons.

By means of the constructions described, the details of which may be varied greatly without departing from the spirit of my invention, the ordinary pedals are entirely dispensed with and the vehicle propelled by the weight of the rider.

Having thus fully described my invention, what I claim as new, and desire to secure by Letters Patent of the United States, is—

The combination, in a vehicle-frame, of a front brace, a pair of side bars, a forked arch connecting the front brace with the two side bars, a crank-shaft journaled at the junction of the front brace and side bars, a tubular upright open at both ends, supported at its lower end in the arch, bushed or thickened at its lower end and provided with a longitudinal slot, a saddle-post slidably mounted in the tubular upright and projecting at the upper and lower ends thereof, a pitman connecting the lower end of the saddle-post with the crank-shaft, a spring coiled about the saddle-post in the tubular upright and having a lower bearing upon a thickened or bushed portion of said upright, a ring adjustable on the saddle-post and forming the upper bearing of the spring, and a set-screw projecting through the slot in the tubular upright and serving to secure the ring to the saddle-post in any adjustment within the limit of the length of the slot, substantially as described.

In testimony whereof I affix my signature.

ANDREAS RIEBER.

In presence of—
G. HERMES,
SIEGFRIED SOHLOVHAUER.